United States Patent
Matsuda et al.

(10) Patent No.: US 6,585,912 B2
(45) Date of Patent: Jul. 1, 2003

(54) ALUMINATE PHOSPHOR AND PROCESS FOR ITS PRODUCTION, PHOSPHOR PASTE COMPOSITION, AND VACUUM ULTRAVIOLET RAY EXCITATION TYPE LIGHT-EMITTING DEVICE

(75) Inventors: Kouhei Matsuda, Kanagawa (JP);
Akihiro Ohto, Kanagawa (JP);
Takayuki Hisamune, Kanagawa (JP)

(73) Assignee: Kasei Optonix, Ltd., Odawara (JP)

( * ) Notice: Subject to any disclaimer, the term of this patent is extended or adjusted under 35 U.S.C. 154(b) by 99 days.

(21) Appl. No.: 09/895,383

(22) Filed: Jul. 2, 2001

(65) Prior Publication Data
US 2002/0020831 A1 Feb. 21, 2002

(30) Foreign Application Priority Data
Jul. 3, 2000 (JP) .................................. 2000-200950

(51) Int. Cl.$^7$ ........................ C09K 11/64; C09K 11/55

(52) U.S. Cl. .................... 252/301.45; 252/301.4 R; 313/486; 313/467

(58) Field of Search ................. 252/301.4 S, 301.4 R; 313/486, 467

(56) References Cited

U.S. PATENT DOCUMENTS

2002/0005506 A1 * 1/2002 Yano et al. ........... 252/301.4 R
2002/0031685 A1 * 3/2002 Yano et al. ................ 428/690

* cited by examiner

Primary Examiner—C. Melissa Koslow
(74) Attorney, Agent, or Firm—Oblon, Spivak, McClelland, Maier & Neustadt, P.C.

(57) ABSTRACT

An aluminate phosphor activated with Eu or coactivated with Eu and Mn, which contains sulfur; a process for its production; a phosphor paste composition; and a vacuum ultraviolet ray excitation type light-emitting device having a fluorescent layer made of such a phosphor.

8 Claims, No Drawings ical devices, wherein a fluorescent layer is formed inside of a light-transmitting envelope of e.g. glass, and a rare gas such as Ar, Xe, Ne or He is sealed therein, so that the phosphor in the fluorescent layer is excited by vacuum ultraviolet rays generated by the discharge of the rare gas, to emit lights. A typical example of such a VUV light-emitting device is a plasma display panel (hereinafter referred to as "PDP") for displaying images or letters, or a rare gas lamp to be used as a light source for reading by a scanner.

ALUMINATE PHOSPHOR AND PROCESS FOR ITS PRODUCTION, PHOSPHOR PASTE COMPOSITION, AND VACUUM ULTRAVIOLET RAY EXCITATION TYPE LIGHT-EMITTING DEVICE

FIELD OF THE INVENTION

The present invention relates to an aluminate phosphor which emits a blue or bluish green color under excitation with ultraviolet rays or vacuum ultraviolet rays having a wavelength of at most 200 nm and a process for its production, a phosphor paste composition containing such a phosphor, and a vacuum ultraviolet ray excitation type light-emitting device (hereinafter referred to as a "VUV light-emitting device") employing such a phosphor.

DISCUSSION OF BACKGROUND

In recent years, developments have been actively carried out for VUV light-emitting devices, wherein a fluorescent layer is formed inside of a light-transmitting envelope of e.g. glass, and a rare gas such as Ar, Xe, Ne or He is sealed therein, so that the phosphor in the fluorescent layer is excited by vacuum ultraviolet rays generated by the discharge of the rare gas, to emit lights. A typical example of such a VUV light-emitting device is a plasma display panel (hereinafter referred to as "PDP") for displaying images or letters, or a rare gas lamp to be used as a light source for reading by a scanner.

PDP is one prepared in such a manner that flat front and rear plates made of e.g. glass are disposed to face each other; electrodes for display and partition walls are provided between them to define discharge spaces at constant distances; a phosphor layer is formed in recesses defined by the front and rear plates and the partition walls; the periphery of the front and rear plates is sealed to form an envelope; and the interior of the envelope is evacuated, and a rare gas is sealed in, so that an electric energy is applied to the electrodes to let the rare gas undergo discharge and thereby to excite the phosphor to generate visible lights, so that an observer can visually identify them. Here, by arranging recesses having a plurality of phosphor layers having different emission colors two dimensionally on a flat plate, full color display has been made possible.

On the other hand, the rare gas lamp is one wherein a fluorescent layer made of a phosphor (hereinafter referred to as a "VUV phosphor") which emits light when excited by vacuum ultraviolet rays, is formed on an inner wall of a slender tube; both ends of the tube are sealed; and a rare gas such as Xe or Xe—Ne is sealed in, so that an electric energy is applied from electrodes formed at both ends of the slender tube or formed at the inside and outside of the slender tube, so that the phosphor is excited with vacuum ultraviolet rays generated by the discharge of the rare gas, to emit visible lights.

The fluorescent layer of PDP among such VUV light-emitting devices, is formed in such a manner that a phosphor for VUV and an organic resin solution such as butyl carbitol or terpineol having a resin such as ethyl cellulose dissolved therein, are kneaded to form a paste, which is then coated at predetermined portions in the cells by e.g. a screen printing method and dried and then, finally baked at a temperature of from about 300 to 550° C. mainly for the purpose of removing the organic component.

On the other hand, also the fluorescent layer of a rare gas lamp among VUV light-emitting devices, is formed in such a manner that a phosphor slurry having a phosphor for VUV suspended in an organic solvent such as butyl acetate containing a resin such as nitrocellulose, is coated on the inner wall of a slender tube, dried and then baked at a temperature of from about 400 to 600° C., to form a fluorescent layer.

As described above, for the formation of the fluorescent layer for a VUV light-emitting device, it is essential to carry out baking treatment of a coated layer in order to remove organic components in the phosphor coating layer. In this baking step, the phosphor is heated in the presence of organic components, whereby it undergoes deterioration, thus leading to a decrease of luminescence brightness. This deterioration of luminescence brightness by baking differs to some extent depending upon the type of the phosphor, and with an aluminate phosphor containing Eu as an activator, such as $BaMgAl_{10}O_{17}$:Eu or $(Ba, Sr)BaMgAl_{10}O_{17}$:Eu,Mn, having excellent emission characteristics with high luminance, as a blue or bluish green phosphor for a VUV light-emitting device, the degree of deterioration of luminance is large particularly in the layer-forming process, and an improvement in this respect has been desired.

SUMMARY OF THE INVENTION

The present invention has been made under these circumstances, and it is an object of the present invention to provide an aluminate phosphor which is less susceptible to deterioration of the luminescence brightness in the layer-forming step for a VUV light-emitting device, and a process for its production, a phosphor paste composition, and a VUV light-emitting device having a fluorescent layer made of such a phosphor.

The present inventors have conducted various studies on an aluminate phosphor using Eu as an activator, such as $BaMgAl_{10}O_{17}$:Eu or $(Ba,Sr)MgAl_{10}O_{17}$:Eu,Mn, and a process for its production, and as a result, have found that when an aluminate phosphor activated with Eu or coactivated with Eu and Mn, which contains sulfur, is used for a phosphor paste composition, the deterioration can be suppressed in the baking step for forming a phosphor layer of a VUV light-emitting device, whereby a blue or bluish green emission with high luminance inherent to the phosphor, can be maintained, and it has been made possible to provide a vacuum ultraviolet ray excitation type light-emitting device having high luminance.

Namely, the present invention provides:

(1) An aluminate phosphor activated with Eu or coactivated with Eu and Mn, which contains sulfur.

(2) The aluminate phosphor according to the above (1), wherein the aluminate phosphor is represented by the following formula and contains sulfur:

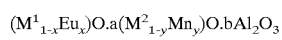

wherein $M^1$ is at least one alkaline earth metal selected from the group consisting of Ba, Sr and Ca, $M^2$ is Mg and/or Zn, and x, y, a and b are numbers within ranges of $0<x<1$, $0 \leq y<1$, $0<a \leq 2$ and $4.5 \leq b \leq 5.5$.

(3) The aluminate phosphor according to the above (2), wherein in the above formula, x, y, a and b are numbers within ranges of $0.05 \leq x \leq 0.5$, $0 \leq y \leq 0.2$, $0.9 \leq a \leq 1.1$ and $4.8 \leq b \leq 5.2$.

(4) The aluminate phosphor according to the above (3), wherein in the above formula, x, y, a and b are numbers such that $0.05 \leq x \leq 0.2$, $y<0.04$, $a=1.0$, and $b=5.0$.

(5) The aluminate phosphor according to any one of the above (1) to (4), wherein the content of sulfur in the above phosphor is within a range of from 5 to 2,000 ppm, preferably from 50 to 500 ppm, more preferably from 50 to 200 ppm.

(6) A process for producing the aluminate phosphor as defined in any one of the above (1) to (3), which comprises firing a mixture of raw materials for the phosphor, to which sulfur or a sulfur compound is incorporated.

(7) The process for producing the aluminate phosphor according to the above (6), wherein the amount of the sulfur or the sulfur compound incorporated, is within a range of from 100 to 20,000 ppm, preferably from 150 to 15,000 ppm, more preferably from 200 to 10,000 ppm.

(8) The process for producing the aluminate phosphor according to the above (6) or (7), wherein at least one of the above sulfur compound contains at least one of metal elements constituting the above aluminate phosphor.

(9) A process for producing the aluminate phosphor as defined in any one of the above (1) to (3), which comprises firing a mixture of raw materials for the phosphor in a sulfurizing gas atmosphere.

(10) A phosphor paste composition comprising an organic binder resin solution and the aluminate phosphor as defined in any one of the above (1) to (5), dispersed in the solution.

(11) A vacuum ultraviolet ray excitation type light-emitting device comprising an envelope and a fluorescent layer formed inside of the envelope, so that the fluorescent layer is excited by vacuum ultraviolet rays generated by discharge of a rare gas sealed in the envelope, to emit light, wherein the fluorescent layer is made of the aluminate phosphor as defined in any one of the above (1) to (5).

DETAILED DESCRIPTION OF THE PREFERRED EMBODIMENTS

The phosphor of the present invention is an Eu-activated aluminate phosphor comprising at least one alkaline earth metal element selected from the group consisting of Ba, Sr and Ca, an Eu element as an activator or Eu and Mn elements as coactivators, Mg and/or Zn element, an Al element and a sulfur element. By incorporating a sulfur element to an Eu-activated aluminate phosphor or to an Eu and Mn-co-activated aluminate phosphor as mentioned above, it is possible to obtain a phosphor which is less susceptible to deterioration in the baking step for formation of a fluorescent layer made of this phosphor.

A preferred phosphor of the present invention can be represented by the following formula:

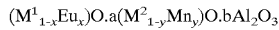

$(M^1{}_{1-x}Eu_x)O \cdot a(M^2{}_{1-y}Mn_y)O \cdot bAl_2O_3$ wherein $M^1$ is at least one alkaline earth metal selected from the group consisting of Ba, Sr and Ca, $M^2$ is Mg and/or Zn, and x, y, a and b are numbers within ranges of $0<x<1$, $0 \leq y<1$, $0<a \leq 2$ and $4.5 \leq b \leq 5.5$.

When the above a and b are selected to be within the above ranges, the crystal structure will be stabilized, and the light-emission under excitation by vacuum ultraviolet rays will be excellent. If they depart from these ranges, it tends to be difficult to obtain constant light-emission. Preferred ranges of the above a and b are $0.9 \leq a \leq 1.1$, and $4.8 \leq b \leq 5.2$ and more preferably, $a=1.0$, and $b=5.0$.

When the above x and y are selected within the above ranges, the crystal structure will be stabilized, and it will be possible to obtain a predetermined emission color with high luminance by vacuum ultraviolet ray excitation. Further, by selecting the above x and y within preferred ranges of $0.05 \leq x \leq 0.5$, and $0 \leq y \leq 0.2$, higher emission intensity can be obtained. More preferred ranges are $0.05 \leq x \leq 0.2$, and $y \leq 0.04$.

The present invention is characterized in that, as mentioned above, by incorporating sulfur to the phosphor, the deterioration during the baking to form a fluorescent layer, is prevented. To obtain such a characteristic and effect, the content of sulfur in the phosphor is adjusted usually within a range of from 5 to 2,000 ppm, preferably from 50 to 500 ppm, more preferably from 50 to 200 ppm. If the sulfur content is lower than 5 ppm, no adequate effect for the addition of sulfur will be obtained, and if it exceeds 2,000 ppm, the luminescence brightness of the phosphor tends to decrease, such being undesirable.

The sulfur content in the fluorescent layer or the phosphor of the present invention was obtained in such a manner that the fluorescent layer or the phosphor was subjected to melt extraction in a high frequency heating furnace in an oxygen atmosphere, and the generated gas was introduced together with a carrier gas into a infrared detector, and the sulfur content was quantified from the intensity of the infrared absorption attributable to $SO_2$ in the infrared absorption spectrum (gas fusion analysis).

The aluminate phosphor of the present invention can be obtained in such a manner that a first raw material compound group comprising the respective metal oxides to constitute the phosphor and carbonates, sulfates, nitrates, halides, etc. to form such oxides by firing, and a second raw material compound group comprising sulfur or at least one member among compounds containing a sulfur element in the chemical compositional formulae (hereinafter referred to simply as "sulfur compounds"), are blended in a ratio to form a composition of a desired aluminate phosphor and sufficiently mixed, and then, the mixture is charged into a heat resistant container such as an alumina crucible and fired at least once in a reducing atmosphere at a temperature of from 1,200 to 1,700° C. over a period of from 2 to 40 hours, whereupon this fired product is subjected to dispersion, washing with water, drying and sieving. When the mixture of raw materials for the phosphor is fired in a plurality of times, it is preferred to carry out the firing in a reducing atmosphere at least once among them.

In the above-mentioned first raw material compound group, it is preferred to employ a sulfur compound of a metal element to constitute an aluminate, as at least one raw material compound therein. In the present invention, it is not essential to use the above first raw material compound group and the above second raw material compound group in combination. Namely, in a case where a sulfur compound of a metal element to constitute an aluminate is used as at least one raw material compound in the first raw material compound group, the second raw material compound group may not necessarily be used. The amount of sulfur to be contained in the aluminate phosphor of the present invention is adjusted by the total amount of sulfur in the above first raw material compound group and the second raw material compound group, as mentioned above and depending upon the firing atmosphere as described hereinafter, etc.

The amount of the sulfur component to be incorporated to the mixture of raw materials for the phosphor is usually within a range of from 100 to 20,000 ppm, preferably from 150 to 15,000 ppm, more preferably from 200 to 10,000 ppm, based on the weight of the obtainable phosphor. If it is lower than 100 ppm, the sulfur content in the obtainable phosphor can not be adjusted to a level of at least 5 ppm, and if it exceeds 20,000 ppm, the sulfur content can not be adjusted to a level of at most 2,000 ppm, whereby the above-mentioned characteristics of the phosphor can not be obtained.

Further, in a process for producing the aluminate phosphor activated with Eu or co-activated with Eu and Mn, of the present invention, the mixture of raw materials for the phosphor may be fired in a sulfurizing gas atmosphere in order to incorporate sulfur to the phosphor. The sulfurizing gas atmosphere for the firing can be formed by firing by disposing sulfur powder in a state separated from the mixture of raw materials for the phosphor, for example, by placing a separate small container filled with sulfur in a heat resistant container filled with the mixture of raw materials for the phosphor and connecting or opening the opening of this small container to a space in the heat resistant container, or by firing while supplying into the heat resistant container a gas containing a sulfur element in its chemical composition, such as $CS_2$ gas, $H_2S$ gas or $SO_x$ gas. As a result, it is possible to form an aluminate phosphor activated with Eu or coactivated with Eu and Mn, which contains a predetermined amount of sulfur. Even in a case where firing is carried out in a sulfurizing gas atmosphere, sulfur or a sulfur compound may be incorporated as the second raw material compound group in the mixture of raw materials for the phosphor, and the above-mentioned amount of sulfur incorporated, may be adjusted by adjusting the sulfurizing atmosphere at the time of firing. Further, a flux such as a fluoride may also be added to the mixture of raw materials for the phosphor followed by firing the mixture.

The phosphor paste composition of the present invention is one obtained by mixing the above phosphor with a binder resin solution having a binder resin dissolved therein and thoroughly kneading the mixture to form a paste. As the binder resin, ethyl cellulose, nitro cellulose, polyethylene oxide or an acrylic resin may, for example, be used. Further, as the solvent, water, butyl acetate, butyl carbitol, butyl carbitol acetate or terpineol may, for example, be used. It is preferred to properly adjust the viscosity of the paste by selecting the type and the amount of the solvent.

A VUV light-emitting device of the present invention can be produced by forming a fluorescent layer in the same manner as for a conventional VUV light-emitting device, by using the phosphor paste composition of the present invention. When the device is PDP, the above-mentioned phosphor paste composition is coated at predetermined portions in the cells by e.g. a screen printing method, followed by drying and then by baking at a temperature of from 400 to 550° C. to form a fluorescent layer made of the aluminate phosphor of the present invention, whereby a VUV light-emitting device of the present invention can be produced.

When the device is a rare gas lamp, a slurry having the above phosphor dispersed in a solvent is cast into a slender tube of a glass, so that it is coated on the inner wall, followed by drying and then by baking at a temperature of from 400 to 600° C. to form a fluorescent layer, and electrodes are attached to both ends of the slender tube or to the inside and outside of the slender tube. Then, the interior is evacuated and then a rare gas is introduced in the slender tube, followed by sealing at both ends, whereby a VUV light-emitting device of the present invention can be produced.

Further, the degree of deterioration in the baking step for the formation of the phosphor layer of the present invention, was evaluated as follows.

30 Parts by weight of the phosphor of the present invention was kneaded with 70 parts by weight of the binder resin and a solvent, and the obtained phosphor paste composition was coated on a glass plate in a thickness of 100 μm. The coated layer of the phosphor paste composition was dried at 80° C. for 50 minutes and further baked at 500° C. for 30 minutes to obtain a fluorescent layer. The obtained fluorescent layer was excited with vacuum ultraviolet rays of 146 nm to emit lights, whereby the luminance and the chromaticity of the emission color were measured.

The luminescence brightness of a blue phosphor varies substantially in proportion to its emission color (value y of the chromaticity point). Accordingly, in the present invention including the following Examples and Comparative Examples, the luminescence brightness was compared in all cases by a value obtained by dividing the luminance by the value y of the chromaticity coordinate (i.e. luminance/y). The luminance/y value of each fluorescent layer was represented by a relative value, when the luminance/y of a $Ba_{0.9}Eu_{0.1}MgAl_{10}O_{17}$ phosphor as one of conventional aluminate phosphors, was taken as 100%. And, the ratio of the luminance/y value of each fluorescent layer (luminance/y)$_b$ to the luminance/y value of the phosphor powder used for the preparation of the fluorescent layer (luminance/y)$_0$ was defined as the luminance-maintaining ratio ($M_b$) of the fluorescent layer and was obtained by the following formula, whereby the degree of deterioration in the baking step was evaluated. Namely, ($M_b$) is a numerical value as an index to show to what extent the luminance of the phosphor powder used for the preparation of a fluorescent layer, is maintained when the coated layer of the phosphor paste composition was fired to form the fluorescent layer.

($M_b$)=[(luminance/y)$_b$/(luminance/y)$_0$]×100 (%)

Now, the present invention will be described in further detail with reference to Examples. However, it should be understood that the present invention is by no means restricted to such specific Examples.

EXAMPLE 1

The following compounds were used as raw materials for a phosphor, and they were thoroughly mixed.

| | |
|---|---|
| $BaCO_3$ | 0.9 mol |
| $Eu_2O_3$ | 0.05 mol |
| $Al_2O_3$ | 4.9912 mol |
| $Al_2(SO_4)_3 \cdot nH_2O$ | 0.0166 mol |
| $MgCO_3$ | 1.0 mol |
| $AlF_3$ | 0.004 mol |

In this mixture of raw materials, a sulfur element was contained in an amount of 2,260 ppm by weight based on the phosphor. The mixture of raw materials was packed into an alumina crucible, and a cover was put thereon, followed by firing in a reducing atmosphere at a maximum temperature of 1,450° C. over a period of 25 hours inclusive of the temperature raising and falling time. The fired product was subjected to dispersion, washing with water, drying and sieving to obtain an Eu-activated aluminate phosphor of Example 1 represented by a compositional formula of $Ba_{0.9}Eu_{0.1}MgAl_{10}O_{17}$ and containing 124 ppm of a sulfur element.

30 Parts by weight of this phosphor, 7 parts by weight of ethyl cellulose and 63 parts by weight of a solvent mixture of butyl carbitol and butyl carbitol acetate, were kneaded to obtain a phosphor paste composition. This phosphor paste composition was coated on a glass plate in a thickness of 100 μm and dried at 80° C. for 50 minutes, followed by baking in air at 500° C. for 30 minutes to obtain a fluorescent layer of Example 1.

The fluorescent layer of Example 1 thus obtained, was excited with vacuum ultraviolet rays of 146 nm to emit lights, whereby the (luminance/y)$_b$ value at that time was 121% of the (luminance/y)$_b$ value of the fluorescent layer of Comparative Example 1 obtained in the same manner as for the fluorescent layer of Example 1 by using the phosphor of Comparative Example 1 represented by a composition of $Ba_{0.9}Eu_{0.1}MgAl_{10}O_{17}$ prepared in the same manner as for the phosphor of Example 1 except that the mixture of raw materials for the phosphor disclosed in Comparative Example 1 in Table 1 was used. Further, the luminance-maintaining ratio of the fluorescent layer of Example 1 formed by the phosphor paste composition prepared by using the phosphor of Example 1 was $(M_b)$=81.6%, while the luminance maintaining ratio of the fluorescent layer formed by the phosphor paste composition prepared by using the phosphor of Comparative Example 1, was $(M_b)$= 67.3%.

EXAMPLES 2 TO 5

Eu-activated aluminate phosphors of Examples 2 to 5 represented by a compositional formula of $Ba_{0.9}Eu_{0.1}MgAl_{10}O_{17}$ and containing sulfur in the amounts shown in Table 1, respectively, based on the phosphors, were obtained in the same manner as in Example 1 using, as raw material for the phosphors, the compounds and their blend ratios (by mol) as shown in Table 1. The "weight of S incorporated" in Table 1 represents the weight ratio (ppm) based on the phosphor to be obtained.

Further, in the same manner as in Example 1, fluorescent layers of Examples 2 to 5 were obtained from the phosphors of Examples 2 to 5. The $(luminance/y)_b$ values and the luminance-maintaining ratios $(M_b)$ of these fluorescent layers are shown in Table 2.

TABLE 1

| | $BaCO_3$ (mol) | $Eu_2O_3$ (mol) | $MgCO_3$ (mol) | $Al_2O_3$ (mol) | $AlF_3$ (mol) | $Al_2(SO_4)_3 \cdot nH_2O$ (mol) | Weight of S incorporated (ppm) |
|---|---|---|---|---|---|---|---|
| Ex. 2 | 0.9 | 0.05 | 1 | 4.9991 | 0.004 | 0.0017 | 226 |
| Ex. 3 | 0.9 | 0.05 | 1 | 4.9978 | 0.004 | 0.0041 | 565 |
| Ex. 4 | 0.9 | 0.05 | 1 | 4.9956 | 0.004 | 0.0083 | 1130 |
| Ex. 5 | 0.9 | 0.05 | 1 | 4.9781 | 0.004 | 0.0414 | 5650 |
| Comp. Ex. 1 | 0.9 | 0.05 | 1 | 5 | 0.004 | 0 | 0 |

TABLE 2

| | S content (ppm) | $(Luminance/y)_b$ (%) | Luminance-maintaining ratio $M_b$ (%) |
|---|---|---|---|
| Ex. 2 | 8 | 105 | 71.1 |
| Ex. 3 | 63 | 110 | 72.1 |
| Ex. 4 | 92 | 120 | 80.1 |
| Ex. 5 | 187 | 123 | 85.6 |
| Comp. Ex. 1 | 0 | 100 | 67.3 |

It is evident from Table 2 that with the fluorescent layers of Examples 2 to 5 made of the phosphors containing at least 8 ppm of sulfur even after firing, prepared by adding at least 200 ppm of sulfur at the time of firing the phosphors, the luminance-maintaining ratios $(M_b)$ are high, and the $(luminance/y)_b$ values are also high, as compared with the fluorescent layer of Comparative Example 1 made of the phosphor of Comparative Example 1.

EXAMPLE 6

A phosphor and a fluorescent layer of Example 6 were prepared in the same manner as in Comparative Example 1 except that the phosphor raw material in Comparative Example 1 (total weight: 360 g) was packed into an alumina crucible, and a small size alumina container containing 25 g of a sulfur powder was placed on the surface of the phosphor raw material, followed by firing. As a result, an aluminate phosphor represented by a compositional formula of $Ba_{0.9}Eu_{0.1}MgAl_{10}O_{17}$ and having a sulfur content of 216 ppm based on the phosphor, was obtained. The $(luminance/y)_b$ value and the luminance-maintaining ratio $(M_b)$ of the fluorescent layer of Example 6 were measured and found to be 112% and 75.0%, respectively.

EXAMPLE 7

An Eu-activated aluminate phosphor of Example 7 represented by a compositional formula of $Ba_{0.9}Eu_{0.1}MgAl_{10}O_{17}$, and having a sulfur content of 126 ppm based on the phosphor, was prepared in the same manner as in Example 1 except that 5.0 mol of $Al_2O_3$ was used instead of 4.9912 mol of $Al_2O_3$ and 2260 ppm of a sulfur powder based on the weight of the phosphor to be obtained, was used instead of 0.0166 mol of $Al_2(SO_4)_3 \cdot nH_2O$, as raw materials for the phosphor. Using this phosphor, a fluorescent layer of Example 7 was obtained in the same manner as in Example 1. The $(luminance/y)_b$ value and the luminance-maintaining ratio $(M_b)$ of this fluorescent layer were measured, and found to be 111% and 77%, respectively.

By adopting the above described construction, the present invention has made it possible to obtain an Eu-activated aluminate phosphor having high emission efficiency and being less susceptible to deterioration of the luminance even after a coating layer formed by coating a paste on a support, is further baked to form a fluorescent layer, and to provide a VUV light-emitting device having an improved emission efficiency.

The entire disclosure of Japanese Patent Application No. 2000-200950 filed on Jul. 3, 2000 including specification, claims, drawings and summary are incorporated herein by reference in its entirety.

What is claimed is:

1. An alkaline earth magnesium and/or zinc aluminate phosphor doped with sulfur and activated with Eu or coactivated with Eu and Mn.

2. The aluminate phosphor according to claim 1, wherein the aluminate phosphor, which is doped with sulfur, is represented by the following formula:

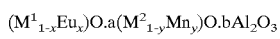

$(M^1_{1-x}Eu_x)O \cdot a(M^2_{1-y}Mn_y)O \cdot bAl_2O_3$ where $M^1$ is at least one alkaline earth metal selected from the group consisting of Ba, Sr and Ca, $M^2$ is Mg and/or Zn, and x, y, a and b are numbers within ranges of $0<x<1$, $0 \leq y<1$, $0<a \leq 2$ and $4.5 \leq b \leq 5.5$.

3. The aluminate phosphor according to claim 1, wherein the content of the sulfur in the aluminate phosphor is within a range of from 5 to 2,000 ppm.

4. A process for producing an aluminate phosphor, the process comprising firing a mixture of raw materials for the phosphor and sulfur or sulfur compound, and firing the mixture at least once in a reducing atmosphere at a temperature in a range of from 1,200 to 1,700° C. for a period in a range of from 2 to 40 hours; and producing the aluminate phosphor of claim 1.

5. The process according to claim 4, wherein the mixture of raw materials comprises an amount of sulfur within a range of from 100 to 20,000 ppm based on the weight of the aluminate phosphor or an amount of a sulfur compound within a range of from 100 to 20,000 ppm, as calculated as the weight of sulfur, based on the weight of the aluminate phosphor.

6. A process for producing an aluminate phosphor, the process comprising firing a mixture of raw materials in a sulfurizing gas atmosphere; and producing the aluminate phosphor of claim 1.

7. A phosphor paste composition comprising an organic binder resin solution and the aluminate phosphor of claim 1 dispersed in the solution.

8. A vacuum ultraviolet ray excitation light-emitting device comprising an envelope and a fluorescent layer inside the envelope, wherein the fluorescent layer comprises the aluminate phosphor of claim 1.

* * * * *